Figure 4:
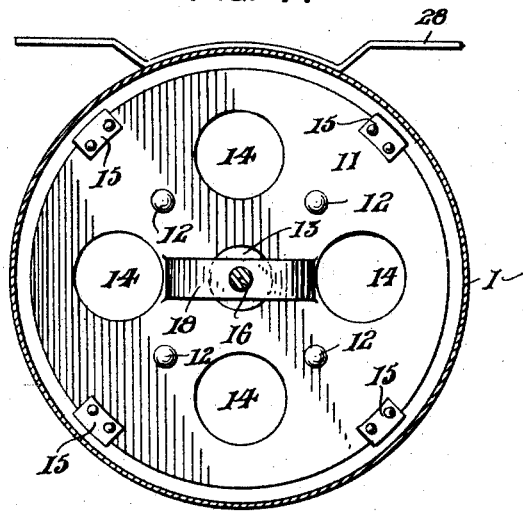

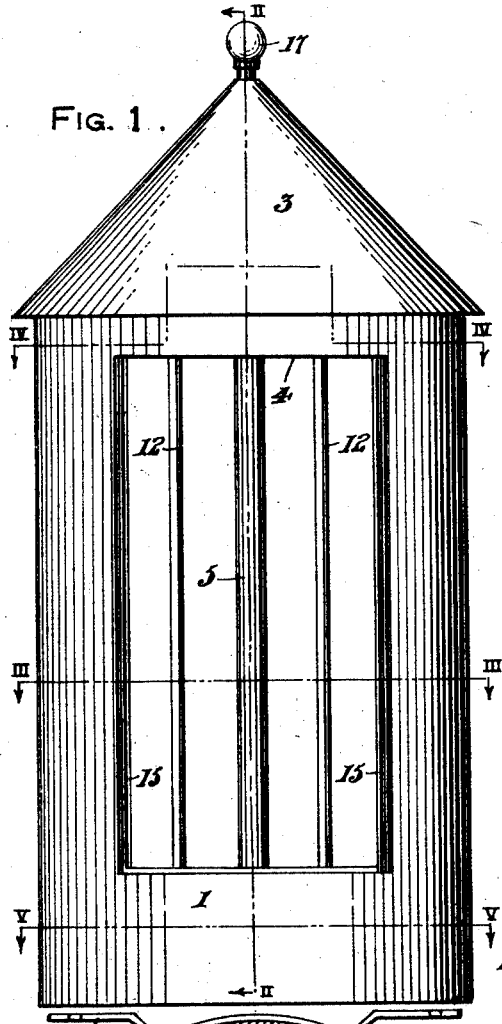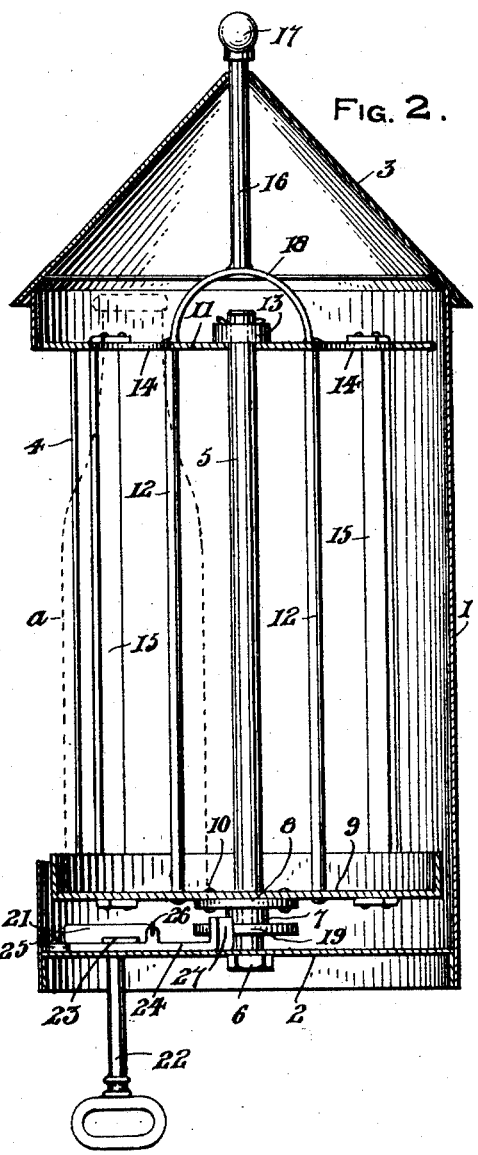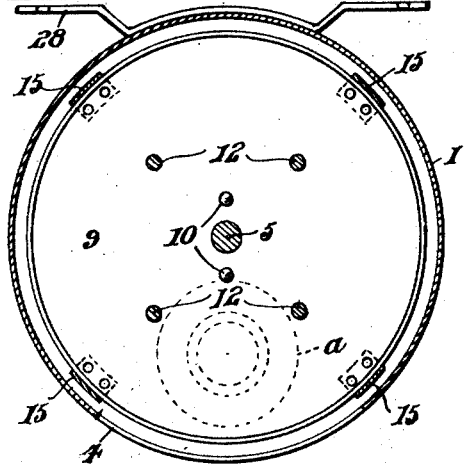

UNITED STATES PATENT OFFICE.

JOHN SANDOR AND JOHN TOTH, OF LORAIN, OHIO.

MILK-BOTTLE RECEPTACLE.

1,415,953.  Specification of Letters Patent.  Patented May 16, 1922.

Application filed May 18, 1921. Serial No. 470,644.

*To all whom it may concern:*

Be it known that we, JOHN SANDOR and JOHN TOTH, citizens of Czecho-Slovakia, residing at Lorain, in the county of Lorain and State of Ohio, have invented certain new and useful Improvements in Milk-Bottle Receptacles, of which the following is a specification.

This invention relates to certain new and useful improvements in milk bottle receptacles and has particular reference to that type of receptacle adapted for receiving milk bottles, with the bottles locked within the receptacle and prevented from being removed until lock mechanism associated with the receptacle is released.

A further object of the invention has reference to a milk bottle receptacle wherein a casing provided with a side bottle receiving opening has a cage for supporting milk bottles rotatably mounted therein with locking devices associated with the cage to permit the rotation thereof to displace a bottle positioned in the casing out of registration with the receiving opening, the lock devices permitting movement of the bottle support only in one direction and locking the bottle support against rotation with all of the compartments thereof, either are filled with bottles or pass the receiving opening in the case.

With the above general objects in view and others that will appear as the nature of the invention is better understood, the present invention consists in the novel form, combination and arrangement of parts hereinafter more fully described in connection with the accompanying drawings, in which like reference characters indicate corresponding parts throughout the several views.

Figure 5:
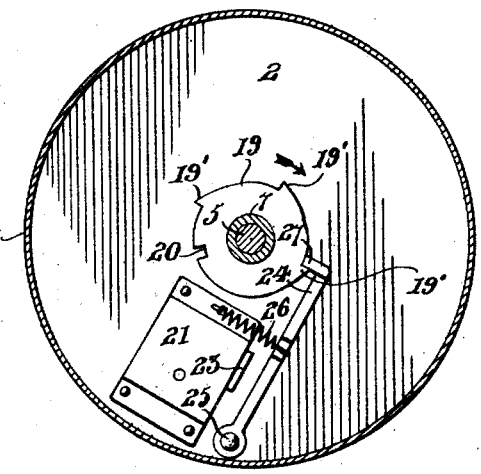
Figure 7:
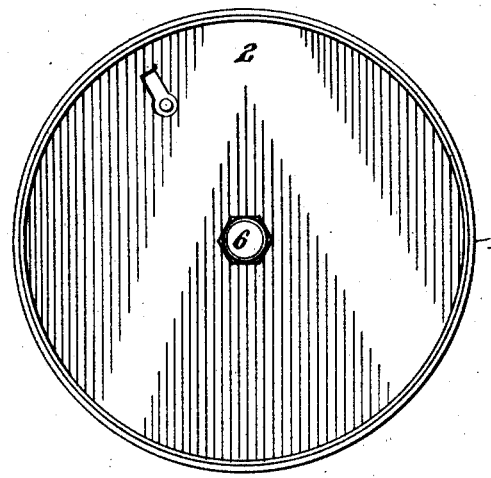
Figure 6:
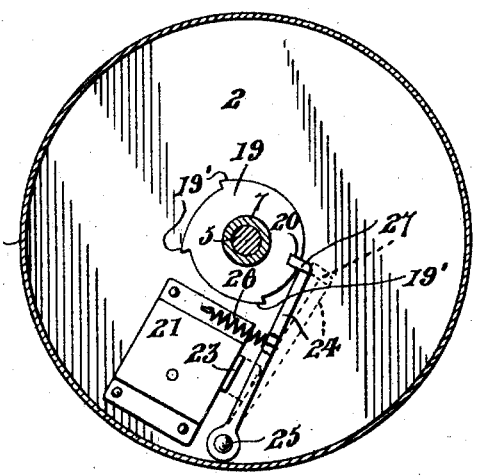

In the drawings,

Figure 1 is a side elevational view of a milk bottle receptacle constructed in accordance with the present invention, Figure 2 is a vertical sectional view taken on line II—II of Figure 1 showing the rotatable bottle supporting frame within the casing and the lock device associated with the bottle supporting frame, Figure 3 is a horizontal sectional view taken on line III—III of Figure 1 showing the bottle receiving side opening in the outer casing, Figure 4 is a horizontal sectional view taken on line IV—IV of Figure 1 showing the top wall of the bottle supporting frame with the openings therein for receiving the necks of the bottles, and the mounting bracket for the receptacle, Figure 5 is a horizontal sectional view taken on line V—V of Figure 1 showing the lock and ratchet devices cooperatively carried by the casing and bottle supporting frame, with the ratchet lever engaging one of the pawls of a ratchet disk, Figure 6 is a horizontal sectional view similar to Figure 5 showing the pawl received in the locking notch of the ratchet disk and Figure 7 is a bottom plan view of the casing showing the key hole controlling access to the locking mechanism.

Referring more in detail to the accompanying drawings, there is illustrated a milk bottle receptacle comprising a cylindrical casing 1 closed at its lower end by a bottom wall 2 and having a conical cover 3 suitably secured to the upper end thereof. The side wall of the casing 1 is cut away as at 4, shown in Figures 1 to 3 to provide for the placing of a milk bottle into the casing.

A milk bottle supporting frame is rotatably supported in the casing 1 and embodies a central shaft 5 anchored at its lower end as at 6 centrally of the bottom wall 2 of the casing and has journaled thereon adjacent the bottom wall, a collar 7 carrying an outwardly directed flange 8 that is secured to a peripherally flanged platform disk 9 having a central opening therein to accommodate the shaft 5, with fastening devices 10 securing the platform disk 9 to the flange 8, this construction being clearly shown in Figure 2. A circular plate 11 is rotatably mounted upon the upper end of the shaft 5 and is spaced from the platform disk 9 by the rods 12 with a washer or other clamping device 13 secured to the upper end of the rod 5 above the plate 11. As shown in Figures 2 and 4, the plate 11 is provided with openings 14 to accommodate the necks of milk bottles —*a*— indicated by dotted lines in Figure 2. Any number of these openings 14 may be provided in the plate 11, four of said bottle neck receiving openings being illustrated and associated with said openings to divide the bottle supporting frame into separate compartments. The platform disk 9 and the circular plate 11 are connected at their edges by perpendicular guard rails 15 spaced between adjacent openings. To rotate the bottle receiving frame, an operating rod 16 extending through an opening in the apex of the conical cover 3 and provided with a handle 17 upon the upper end thereof, is attached at its lower end to a curved strap 18 carried by the upper face of the plate 11, the knob 17 being grasped to effect rotation of the bottle receiving frame upon the shaft 5.

The locking mechanism associated with the casing and bottle supporting frame embodies a ratchet disk 19 carried by the lower end of the collar 7 and having three ratchet teeth 19′ formed on the periphery thereof, the edge of the ratchet disk intermediate two of the ratchet portions 19′ being provided with a locking notch or recess 20. A key operated lock 21 is secured upon the upper face of the bottom wall 2 as shown in Figures 2, 5, and 6 and through the instrumentality of the key 22 is adapted to project the sliding bolt 23 from the lock casing. A lever 24 pivoted as at 25 upon the bottom wall 2 adjacent the lock casing 21 has the intermediate portion thereof attached to one end of a spring 26 that is anchored at its other end to the lock casing for the purpose of moving the pawl 27 carried by the free end of the lever into engagement with the periphery of the ratchet disk 19. The milk bottle receptacle may be supported in any convenient manner, brackets 28 being carried by the casing wall 1 for mounting the same upon a wall or other support.

The ratchet disk 19 is associated with the bottle supporting frame in a manner whereby the locking notch or groove 20 receives the pawl 27 of the lever 24 when one of the guard rails 15 is positioned midway of the bottle receiving opening 4 in the casing 1, this locking arrangement being shown in Figure 6. As illustrated by dotted lines, in Figure 6, the key 22 inserted in the lock casing 21 will project the bolt 23 for engagement with the lever 24 to move the same against the tension of spring 26 and displace the pawl 27 from the locking notch 20 and by slightly rotating the bottle supporting frame by the rod handle 17, the locking notch is displaced from alinement with the pawl and the guard rail displaced from the casing opening 4. By retracting the bolt 23 into the lock casing, the spring 26 will cause the pawl 27 of the lever to ride over the periphery of the ratchet disk 19. The bottles —a— are inserted into the casing 1 with the neck portions thereof received in the openings 14 in the plate 11 and by rotating the bottle supporting frame by the handle 17, the pawl 27 cooperates with the disk ratchets 19′ to prevent retrograde movement of the bottle supporting frame with the milk bottle securely locked within the casing. The device may be constructed to accommodate any number of bottles, and upon a complete rotation of the bottle supporting frame, the locking notch 20 is positioned to receive the pawl 27 with all the bottles locked within the casing. To remove the bottles, it is necessary to shift the sliding bolt 23 of the lock to displace the pawl 27 from the locking notch 20 and the lever may be so retained by the bolt 23 to permit the bottle supporting frame to be rotated in either direction. When the receptacle is completely filled with bottles, the bottle supporting frame is so positioned as to present one of the guard rails 15 to extend perpendicularly of the opening 4 so that it is impossible to remove or insert the bottles until the locking mechanism is released.

While there is herein shown and described the preferred embodiment of the present invention, it is nevertheless to be understood that minor changes may be made without departing from the spirit and scope of the invention as claimed.

What is claimed as new is:

1. A milk bottle receptacle comprising a casing, a bottle supporting frame rotatably supported therein, said casing having a bottle entrance opening in the side wall thereof, means for rotating the bottle supporting frame, means to prevent retrograde movement thereof, means for locking the bottle supporting frame against rotation, said bottle supporting frame including a base supporting disk and an upper plate, rods connecting the disk and plate and guard rails extending between the disk and plate adapted to be positioned in front of the casing opening when the bottle supporting frame is in a locked position.

2. A milk bottle receptacle comprising a casing, a bottle supporting frame rotatably supported therein, said casing having a bottle entrance opening in the side wall thereof, means for rotating the bottle supporting frame, means to prevent retrograde movement thereof, means for locking the bottle supporting frame against rotation, said bottle supporting frame including a base supporting disk and an upper plate, rods connecting the disk and plate and guard rails extending between the disk and plate adapted to be positioned in front of the casing opening when the bottle supporting frame is in a locked position, the means for rotating the bottle supporting frame embodying a handle secured to the upper plate and extending through the upper end of the casing.

3. A milk bottle receptacle comprising a casing, a milk bottle supporting frame journaled therein, means for rotating said frame, a ratchet disk carried by said frame and a lever pivoted to said casing cooperating with said disk to prevent retrograde movement thereof, said disk being constructed for engagement with said lever to hold the bottle supporting frame against rotation.

4. A milk bottle receptacle comprising a casing, a milk bottle supporting frame journaled therein, means for rotating said frame, a ratchet disk carried by said frame, said disk having a locking notch in the periphery thereof adapted to receive a lever to hold the bottle supporting frame against rotation.

5. A milk bottle receptacle comprising a casing, a milk bottle supporting frame journaled therein, means for rotating said frame, a ratchet disk carried by said frame, said disk having a locking notch in the periphery thereof adapted to receive a lever to hold the bottle supporting frame against rotation and a key operated sliding lock bolt adapted to engage the lever to disengage the same from the disk.

In testimony whereof we affix our signatures in presence of two witnesses.

JOHN SANDOR.
JOHN TOTH.

Witnesses:
   J. B. DANKO,
   MICHAEL HADVAB.